US007579179B2

(12) United States Patent
Bryhan et al.

(10) Patent No.: US 7,579,179 B2
(45) Date of Patent: Aug. 25, 2009

(54) CELL GROWTH SURFACE ON A POLYMERIC SUBSTRATE

(75) Inventors: Marie D. Bryhan, Lindley, NY (US); Paul E. Gagnon, Milton, NH (US); Oliva V. Lachance, Dover, NH (US); Zhong-he Shen, Grayslake, IL (US); Hongming Wang, Kennebunk, ME (US)

(73) Assignee: Corning Incorporated, Corning, NY (US)

( * ) Notice: Subject to any disclaimer, the term of this patent is extended or adjusted under 35 U.S.C. 154(b) by 516 days.

(21) Appl. No.: 10/382,681

(22) Filed: Mar. 5, 2003

(65) Prior Publication Data

US 2003/0180903 A1    Sep. 25, 2003

Related U.S. Application Data

(63) Continuation-in-part of application No. 09/947,035, filed on Sep. 4, 2001, now Pat. No. 6,617,152.

(51) Int. Cl.
*C12N 11/00* (2006.01)
*C12N 5/00* (2006.01)
*C12M 3/00* (2006.01)
*C12M 1/22* (2006.01)

(52) U.S. Cl. .................... 435/180; 435/402; 435/304.1; 435/305.1

(58) Field of Classification Search ................ 435/402, 435/304.1, 304.3, 305.1, 180
See application file for complete search history.

(56) References Cited

U.S. PATENT DOCUMENTS

| 4,452,679 A | 6/1984 | Dunn et al. ............... 204/164 |
| 4,752,426 A | 6/1988 | Cho ........................... 264/22 |
| 4,919,659 A * | 4/1990 | Horbett et al. ............ 427/2.25 |
| 4,927,676 A | 5/1990 | Williams et al. ............... 428/36 |
| 5,257,633 A | 11/1993 | Vogler et al. ................ 128/763 |
| 5,283,086 A | 2/1994 | Kodama et al. ............. 427/576 |
| 5,369,012 A | 11/1994 | Koontz et al. ................. 33/545 |
| 5,702,770 A | 12/1997 | Martin ....................... 427/475 |
| 5,704,983 A | 1/1998 | Thomas et al. .............. 118/723 |

(Continued)

FOREIGN PATENT DOCUMENTS

WO    WO 99/17334    4/1999

(Continued)

OTHER PUBLICATIONS

Onyiriuka. "The Effects of High-Energy Radiation on the Surface Chemistry of Polystyrene: A Mechanistic Study." Journal of Applied Polymer Science, vol. 47 (1993), pp. 2187-2194.*

(Continued)

*Primary Examiner*—William H Beisner
(74) *Attorney, Agent, or Firm*—Susan S. Wilks; Lawrence A. Villanue

(57) ABSTRACT

A product exhibiting an improved cell growth surface and cell attachment. According to the present invention, a stream of plasma is comprised of activated gaseous species generated by a microwave source. This stream is directed at the surface of a polymer substrate in a controlled fashion such that the surface is imparted with attributes for cell adhesion far superior to that of untreated polymer or polymer treated by other methods.

33 Claims, 10 Drawing Sheets

U.S. PATENT DOCUMENTS

| | | | |
|---|---|---|---|
| 6,033,582 A | 3/2000 | Lee et al. | 216/37 |
| 6,117,243 A | 9/2000 | Walther | 118/713 |
| 6,130,080 A | 10/2000 | Fuller | 435/243 |
| 6,306,646 B1 | 10/2001 | Saad et al. | 435/305.1 |
| 6,391,655 B1 | 5/2002 | Bookbinder et al. | 436/531 |

FOREIGN PATENT DOCUMENTS

| | | |
|---|---|---|
| WO | WO 0056808 A2 * | 9/2000 |
| WO | WO 01/58502 A1 | 8/2001 |

OTHER PUBLICATIONS

Johansson et al. "Characterization of Air Plasma-Treated Polymer Surfaces by ESCA and Contact Angle Measurments for Optimization of Surface Stability and Cell Growth." Journal of Applied Polymer Science, vol. 86, (2002), pp. 2618-2625.*

L'Argentiere et al."PdCl2 anchorage onto the surface of polystyrene films via oxygen and ammonia plasma treatment." Journal of Chemical Technology and Biotechnology, vol. 75 (2000), pp. 25-28.*

Egitto. 'Plasma etching and modification of organic polymers.' P;ure & Appl. Chem. vol. 62, No. 9 (1990), pp. 1699-1708.*

Narmand et al. 'Polymer Treatment in Flowing Afterglow of an Oxygen Microwave Discharge . . . ' Plasma Chemistry and Plasma Processing. vol. 15, No. 2, 1995, pp. 173-198.*

Dorit Keller et al., "Surface Modification of Tissue Culture Polystyrene with Low-Temperature Plasmas", pp. 1043-1044.

Wang et al., CAPLUS Abstract No. 1998: 209716 of Surface modification of polyethylene by microwave plasma., vol. 19(3), pp. 486-488.

Jama, C., Dessaux, O., Goudmand, P. Gengembre, L. and Grimblot J. "Treatment of Poly(ether ether ketone) (PEEK) Surfaces by Remote Plasma Discharge. XPS Investigation of the Ageing of Plasma-treated PEEK", Surface and Interface Analysis, vol. 18, 751-756 (1992).

Matienzo, L.J., Egitto, F.D., Polymer oxidation downstream from oxygen microwave plasmas; Polymer Degradation and Stability 35 (1992) 181-192.

Ginn, B.T., Steinbock, O., "Polymer Surface Modification Using Microwave-Oven-Generated Plasma.", Langmuir 2003, 19, 8117-8118.

Egitto, Frank D., "Plasma etching and modification of organic polymers", Pure & Appl. Chem. vol. 62, No. 9 (1990) pp. 1699-1708.

Anders Larsson; Helene Derand, Stability of Polycarbonate and Polystyrene Surfaces after Hydrophilization with High Intensity Oxygen RF Plasma, Journal of Colloid and Interface Science, 2002, pp. 214-221, vol. 246, Elsevier Science.

Dorit Keller et al., "Surface Modification of Tissue Culture Polystyrene with Low-Temperature Plasmas", pp. 1043-1044, (1997).

Normand et al. "Polymer Treatment in the Flowing Afterglow of an Oxygen Microwave Discharge Active Species Profile Concentrations and Kinetics of the Functionalization", Plasma Chemistry and Plasma Processing, vol. 15, No. 2 (1995), pp. 173-198.

Johansson et al, "Characterization of Air Plasma-Treated Polymer Surfaces by ESCA and Contact Angle Measurements for Optimization of Surface Stability and Cell Growth", Journal of Applied Polymer Science, vol. 86, 2618-2625 (2002).

Argentiere, P., Taher, H., "PdCl2 anchorage onto the surface of polystyrene films via oxygen and ammonia plasma treatment", Journal of Chemical Technology and Biotechnology 75: 25-28 (2000).

Onyiriuka, E. C., "The Effects of High-Energy Radiation on the Surface Chemistry of Polystyrene: A Mechanistic Study", Journal of Applied Polymer Science, vol. 47, 2187-2194 (1993).

* cited by examiner

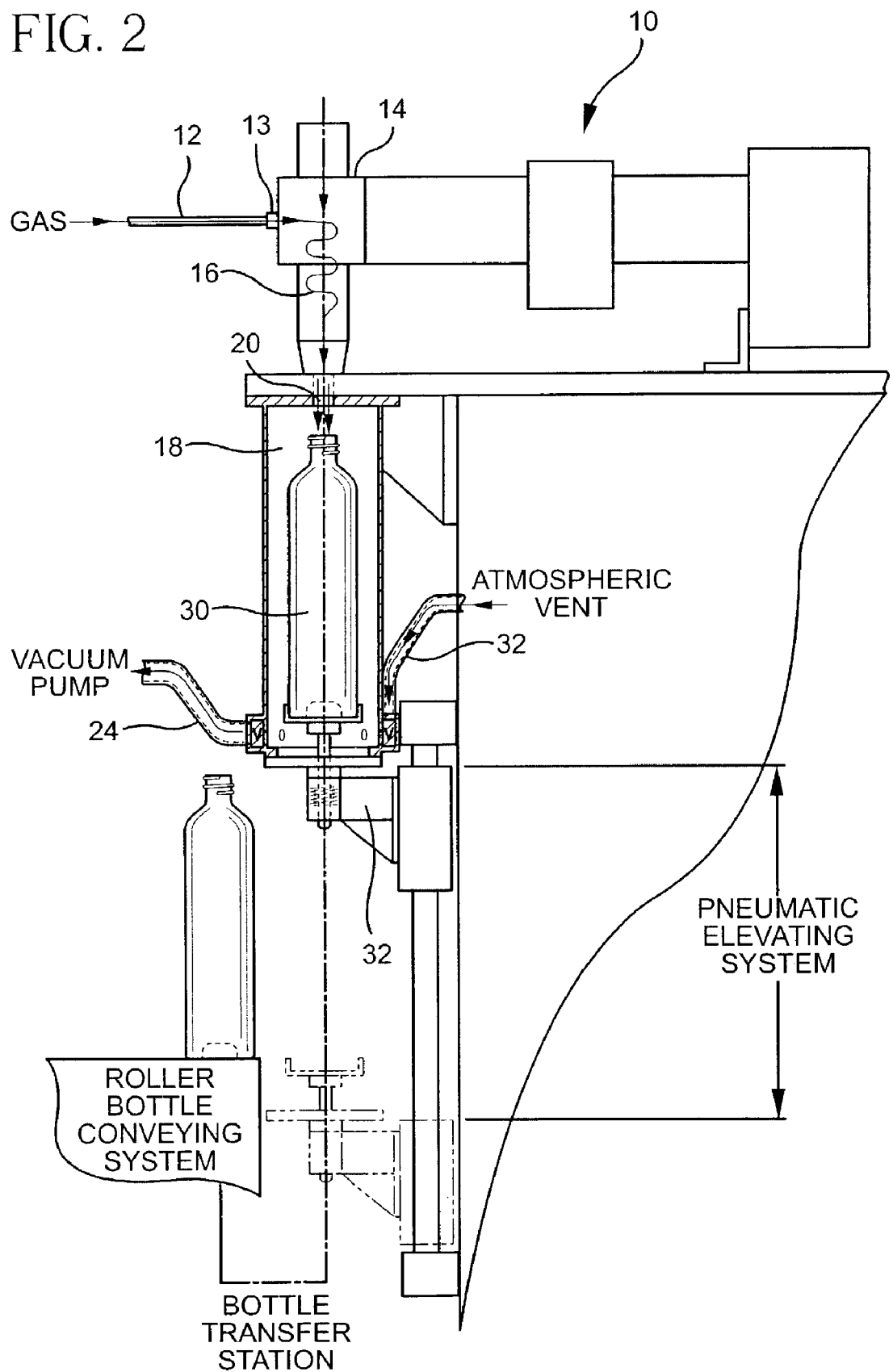

FIG. 4  MW PLASMA IN WATER

FIG. 5  MW PLASMA IN AIR

FIG. 6  RF PLASMA IN WATER

FIG. 7  REAL TIME CONTACT ANGLE STUDY

CELL GROWTH SURFACE ON A POLYMERIC SUBSTRATE

RELATED APPLICATIONS

This application is a continuation-in-part of U.S. patent application Ser. No. 09/947,035, filed on Sep. 4, 2001, now U.S. Pat. No. 6,617,152 entitled "Method for Creating a Cell Growth Surface on a Polymeric Substrate."

BACKGROUND

The present invention relates generally to the field of cell growth laboratory ware and more specifically a product that facilitates cell growth. An apparatus and method for performing the surface treatment is also provided by the present invention.

The cultivation of living cells is a key component in, among other things, the drug discovery process. Many devices are sold for purposes of cell culture including roller bottles, flasks, dishes, multiwell plates, cell harvesting units, etc. Typically these items of laboratory ware are molded from polymers having a sufficient mechanical stability and strength to create the necessary substrate surface for cell attachment and growth.

Generally, cell growth containers or substrates need to be 'surface treated' after molding in order to make the surface hydrophilic and to enhance the likelihood for effective cell attachment. Surface treatment may take the form of a surface coating, but typically involves the use of directed energy at the substrate surface with the intention of generating chemical groups on the polymer surface. These chemical groups will have a general affinity for water or otherwise exhibit sufficient polarity to permit stable adsorption to another polar group. These functional groups lead to hydrophilicity and or an increase in surface oxygen and are properties recognized to enhance cell growth. Such chemical groups include groups such as amines, amides, carbonyls, caboxylates, esters, hydroxyls, sulfhydryls and the like. Examples of directed energy include atmospheric corona discharge, radio frequency (RF) vacuum plasma treatment, and DC glow discharge. These polymer surface treatment methods have displayed varying degrees of success and their effects tend to decay over time.

In the case of plasma treatment, plasmas are created when a sufficient amount of energy is added to gaseous atoms and/or molecules, causing ionization and subsequently generating free electrons, photons, free radicals, and ionic species. The excitation energy supplied to a gas to form a cold plasma can originate from electrical discharges, direct currents, low frequencies, radio frequencies, microwaves or other forms of electromagnetic radiation. Plasma treatments are common for surface modification in the microelectonic and semiconductor industries. As mentioned, atmospheric corona and RF plasma treatment are commonly used for polymeric surface activation for cell growth substrates as well as medical implants.

Current standard practices for growing adherent cells in cell culture involves the use of defined chemical media to which is added up to 10% volume bovine or other animal serum. The added serum provides additional nutrients and/or growth promoters. In addition, serum proteins promote cell adhesion by coating the treated plastic surface with a biolayer matrix to which cells can better adhere. The addition of serum is typically required to support the normal growth of the majority of cell lines. While advantageous for cell growth, serum can have adverse effects by intruding sources of infection or abnormally inducing expression of unwanted genes exposed to serum.

SUMMARY OF INVENTION

According to the present invention, a stream of plasma is comprised of activated gaseous species generated by a microwave source. This stream is directed at the surface of a polymer substrate in a controlled fashion such that the surface is imparted with attributes for cell adhesion far superior to that of untreated polymer or polymer treated by other known methods. The treatment apparatus contains a microwave generator and gas line feeding into a plasma mixing chamber. The plasma mixing chamber is connected to a dual chambered treatment chamber, comprising an inner chamber and an outer chamber. The outer chamber connects directly to the plasma mixing chamber and has a vacuum line outlet in order to create a plasma flow. The inner chamber is contained within the outer chamber and contains a baffle that directs the plasma flow directly onto the polymer surface which is to be treated. The part that has been subjected to the directed plasma stream is imparted with uniform surface characteristics that enable enhanced levels of cell attachment even under reduced serum conditions. The surfaces treated according to the present invention exhibit higher oxygen contents than achieved by currently known methods, and the parts contain higher percentage of oxygen at depth greater than 5-10 nm compared to parts produced using known methods. This surface may also be advantageous in protein binding assays.

BRIEF DESCRIPTION OF THE DRAWINGS

FIG. 2 is a schematic drawing of an embodiment of the microwave plasma treatment apparatus of the present invention.

DETAILED DESCRIPTION

Figure 1:
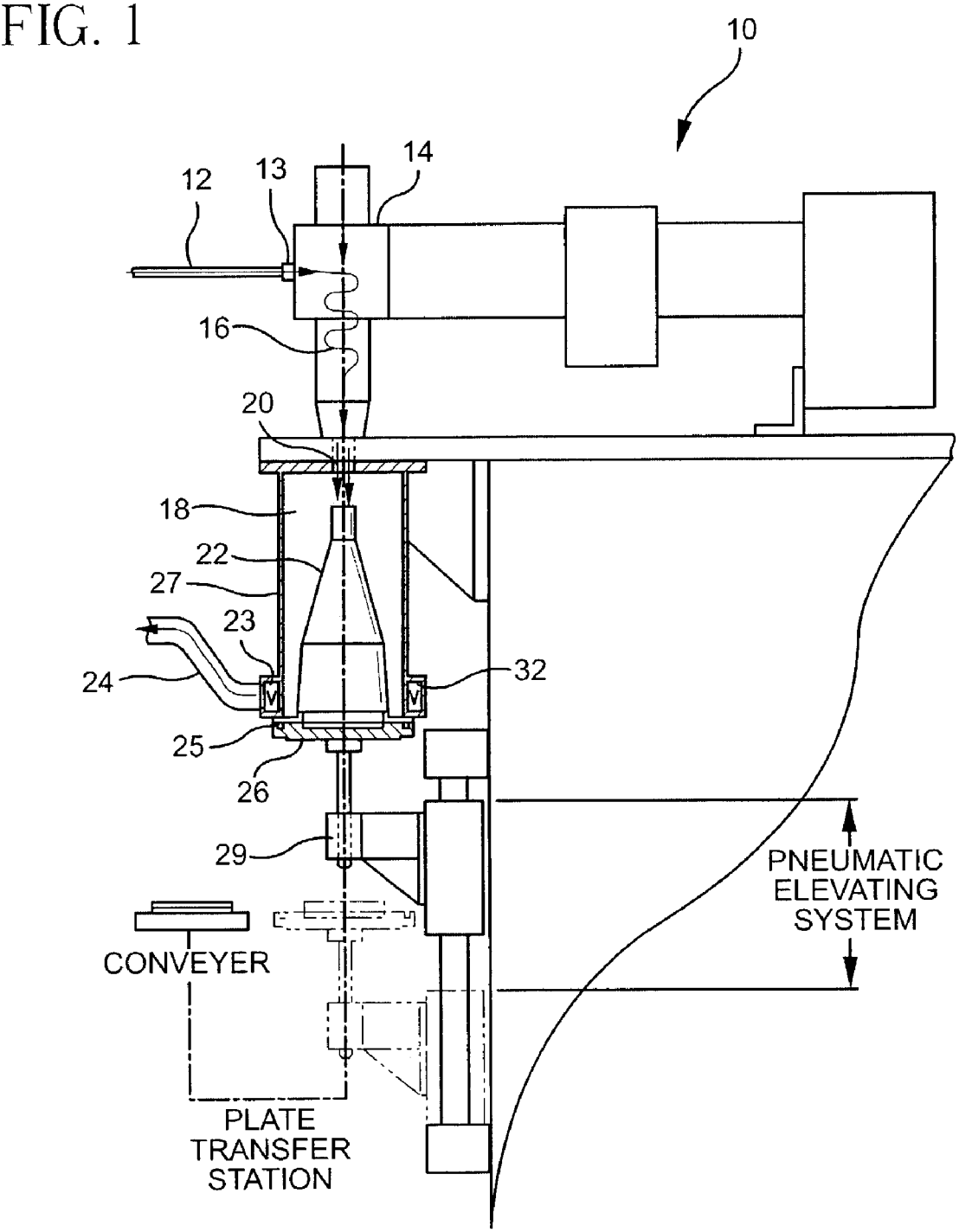
FIG. 1 is a schematic drawing of the microwave plasma treatment apparatus of the present invention.

With reference to FIG. 1, a basic construction of the microwave plasma stream apparatus for carrying out the method of the present invention is provided. A 2.45 GHz microwave generator 10 (MKS Astex, Wilmington, Mass.) serves as the energy source of this apparatus. The equipment preferably includes a generator, circulator, dummy load, tuner, and applicator. A gas line 12 connects to a gas source and delivers the process gas, which when sufficiently energized creates a continuous stream of activated or ionized gas. Suitable plasma gases include argon, nitrogen, oxygen, nitrous oxide, ammonia, carbon dioxide, helium, hydrogen, air and other gases known to those of skill in the art to readily be activated or ionized. A plasma chamber 14 serves as a manifold for the reaction between gas and microwave energy, and is in fluid communication with both the gas line 12, via a valve 13, as well as the microwave generator 10. A conduit 16 connects the plasma chamber with a treatment chamber 18 through an aperture 20. Within the first or outer treatment chamber 18, a second or inner treatment chamber 22 is located. The inner chamber has a frusto-conical baffle section which serves to contain the plasma flow and direct it onto a part that is placed at its base. In this embodiment, the inner chamber shares a common base 25 with the outer chamber. Further, it is preferred that the inner treatment chamber have a top neck portion which roughly matches the aperture 20 in cross sectional area. However, it is preferred that the neck of the inner treatment chamber not connect directly to the aperture. The approximate 1-6 inch gap between the aperture and the neck of the second treatment chamber enable the plasma to flow out of the outer treatment chamber through a valved vacuum line 24. A pneumatic elevating system 29 may be employed to move the base portion 25 away from the treatment chamber in order to remove treated parts and place new parts into the inner chamber in an automated fashion. Preferably, the plasma mixing chamber 14 is of quartz construction. The conduit 16 and outer treatment chamber, may be made from conductive or nonconductive materials, especially, quartz aluminum or stainless steel. The inner treatment chamber is preferably made from a nonconductive material, and most preferably, quartz.

In operation, the apparatus of FIG. 1 performs as follows: A molded polymer part to be treated is located within the inner chamber 22. For purposes of illustration, a multiwell plate 26 has been placed on the base 25, but the inner and outer chamber may be shaped, dimensioned and configured to accommodate any of a variety of polymer parts. A vacuum seal is created between the base 25 and the sidewalls 27 of the outer chamber. To enable continuous flow, vacuum pumping is maintained through the process. The valves 13, 23 are opened and the process gas is allowed to flow into the plasma chamber 14, through the aperture 20 and into the dual chambered treatment area. The gas flows at a pressure preferably between 100 and 2,000 millitorr, and more preferably between 200 and 300 millitorr. The gas preferably set to flow at a rate of 100 to 5,000 cc/min, and more preferably between 400 and 600 cc/min. While the process may run at any range of temperatures, it preferably runs between 40 and 150 degrees Fahrenheit and more preferably at room temperature, or approximately 72 degrees Fahrenheit. The microwave generator is engaged to create an output of between 300 and 10,000 watts, and preferably between 300 and 3,000 watts.

Figure 1A:
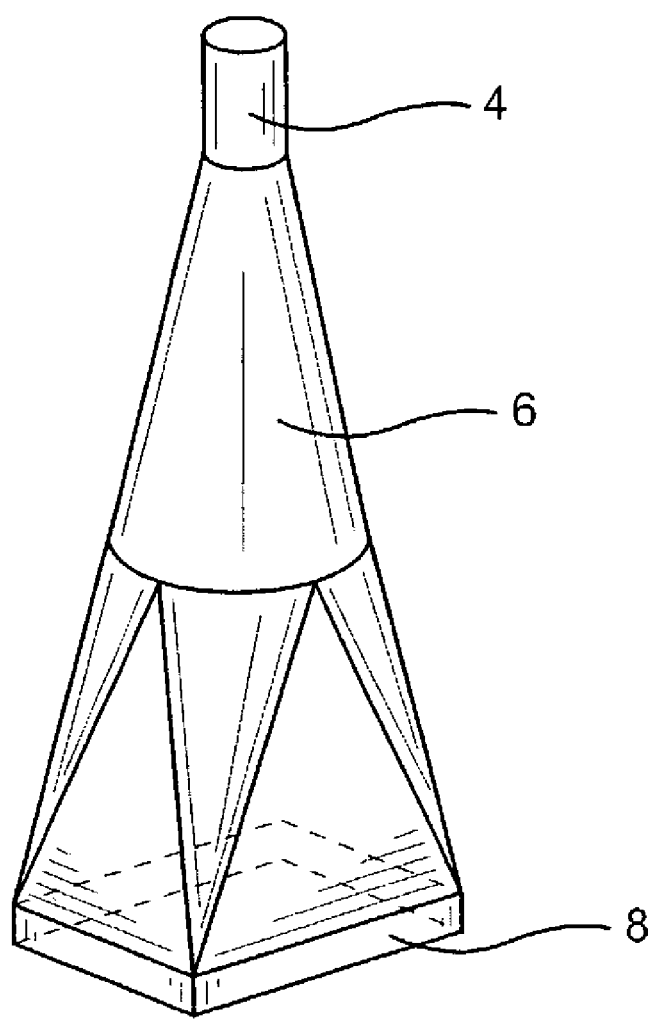
FIG. 1A is a three-dimensional view of the inner chamber one embodiment of the present invention.

The microwave energy entering the plasma chamber 14 interacts with the gas entering the plasma chamber resulting in activation of the gas thereby creating the resultant plasma. Due to the constant flow characteristics of the assembly, the plasma is directed through the conduit 16, through the aperture 20, and into the treatment chamber. The stream or jet created by the plasma flow through the conduit and aperture is directed into the outer treatment chamber 18, subsequently into inner treatment chamber 22, and onto the polymer part 26 placed at the base 25 of the chamber. Flow out of both the inner chamber 22 and outer chamber 18 is assured due to the vacuum line 24, which serves to evacuate the dual chambered treatment area. It should be noted that due to the inner treatment chamber 22, the plasma stream is directed onto the part as opposed to directly toward the outlet valve 23, thereby enabling the part 26 to have optimal contact with the stream. The inner treatment chamber 22 should be entirely enclosed and sealed from the outer chamber 18, but for the opening at the neck. A three-quarters view of the inner chamber is shown in FIG. 1A. A neck portion 4 and a funnel portion 6 make up the frusto-conical top portion. In this embodiment, the base 8 is rectangular in shape so as to receive a well plate.

The plasma is energized for between 1 second and 5 minutes and more preferably for between 5 and 20 seconds. Once treatment is complete, the microwave energy is ceased, valves are closed, an atmospheric vent valve 32 is opened to introduce nitrogen or dry air to the system and in order to return all the chambers to atmospheric pressure. After normalization of pressure, the part is removed by operating the pneumatic elevating system 29. Optimally, a computer control system performs the steps outlined above in an automated fashion. After removal, the part is preferably given a standard sterilization treatment by exposure to gamma radiation.

FIG. 2 is a schematic representation of another embodiment of the present invention. In this embodiment, it is the part to be treated that acts as the inner treatment chamber. As in the previously described embodiment, the apparatus has a gas inlet 12 and a microwave generator 10 in communication with a plasma chamber 14. A plasma stream is created by flow from line 24 which is attached to a vacuum pump. The plasma stream is created by plasma moving through the conduit 16 and aperture 20 and into the outer treatment chamber through the conduit 16 and aperture 20 and into the outer treatment chamber 18. However, in this case, the part to be treated, a roller bottle 30, serves as the "inner chamber". The bottle 30 is placed closed to the aperture, approximately 1-6 inches away, such that the plasma stream will be directed in the bottle. The plasma stream is directed through the neck of the bottle and contacts all inner surfaces of the bottle including the bottom and sidewalls. Again, an atmospheric vent 32 connecting with the outer treatment chamber is employed for pressure equalization in removing the part. As in the previously described embodiment, a pneumatic elevating system 33 may be employed for removal of the part as well as to bring neck portion of the part 30 into close proximity with the aperture 20 at the top of the outer treatment chamber 18.

Figure 3:
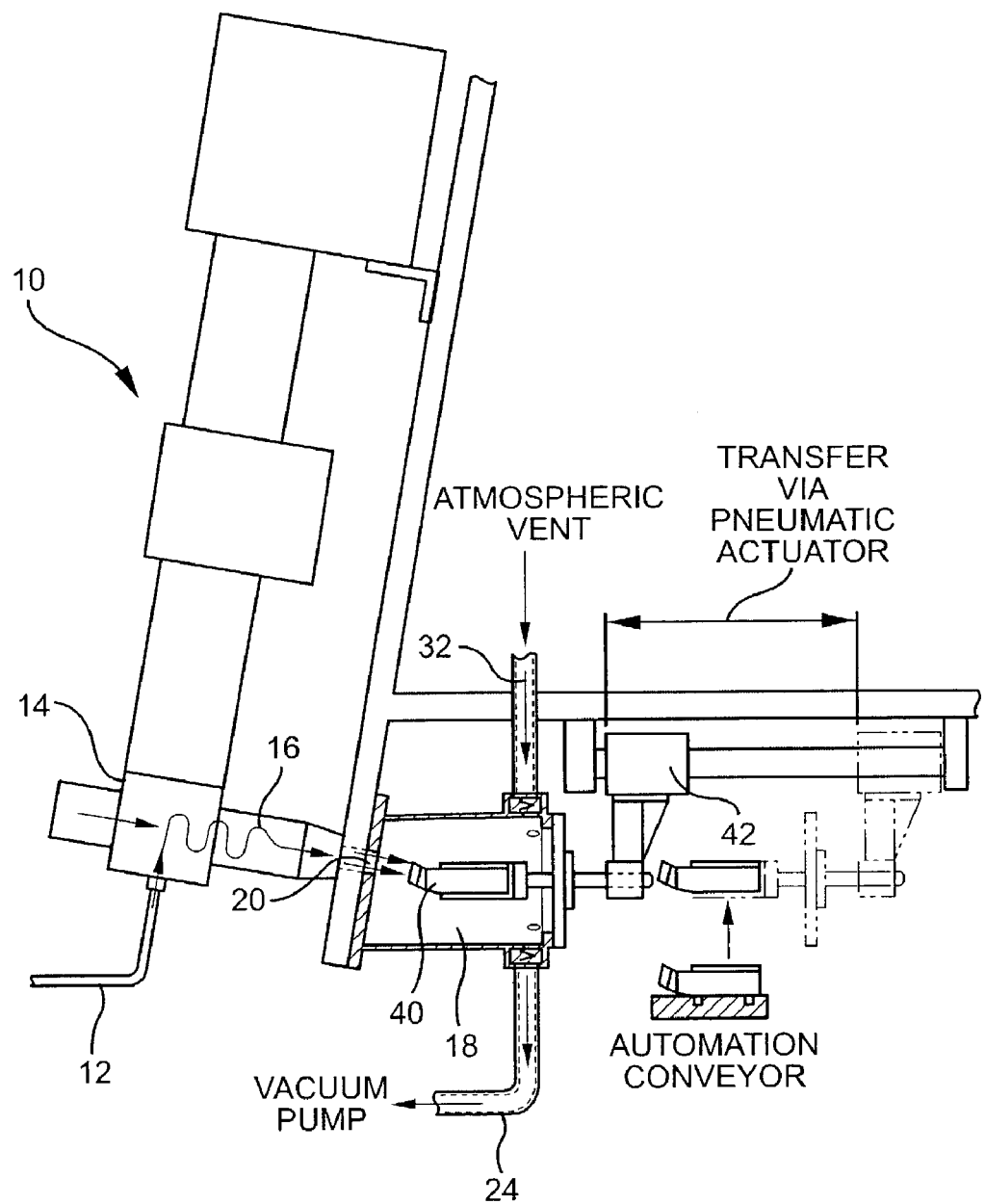
FIG. 3 is a schematic drawing of an embodiment of the microwave plasma treatment apparatus of the present invention.

FIG. 3 is a schematic representation of still another embodiment of the present invention. As in the previous embodiment, it is the part itself that serves as the inner treatment chamber. The part displayed in this embodiment is a flask. The apparatus has a gas inlet 12 and a microwave generator 10 in communication with a plasma chamber 14. A plasma stream is created by flow from line 24 which is attached to a vacuum pump. The plasma stream is created by plasma moving though the conduit and aperture 20 and into the outer treatment chamber 18. As in the previous embodiment, the part to be treated, a flask, serves as the 'inner chamber'. The flask 40 is placed close to the aperture, preferably between 1 and 3 inches away, such that the plasma stream will be directed into the flask. The plasma stream is directed through the neck of the flask and contacts all inner surfaces of the flask including bottom and sidewalls. An atmospheric vent 32 connecting with the outer treatment chamber is employed for pressure equalization and subsequent part removal. As in the previously described embodiments, a pneumatic actuator 42 may be employed for removal of the part 40 as well as to bring the part into close proximity with the aperture 20 at the top of the outer treatment chamber. In this embodiment, the conduit 16 and aperture 20 are angled to align with the angled neck of the part 40. This angling is preferable because it ensures a direct plasma stream into the part.

The surface of the polymeric substrate to be treated can have any shape, for example it can be flat, curved or tubular. Preferably, it is a flat planar surface. For purposes of this invention, the polymeric substrate can be biodegradable or non-biodegradable. Preferably, to be useful in both in vivo and in vitro applications, the polymeric substrates of the present invention are non-toxic, biocompatible, processable, transparent for microscopic analysis, and mechanically stable.

A large variety of polymers may be used as substrates in the articles of the present invention. Examples of polymers useful in the present invention include polyacrylates, polymethylacrylates, polycarbonates, polystyrenes, polysulphones, polyhydroxy acids, polyanhydrides, polyorthoesters, polypropylenes, polyphosphazenes, polyphosphates, polyesters, nylons or mixtures thereof.

Examples of substrates that can be treated by the method disclosed herein include but are not limited to: flasks, dishes, flat plates, well plates, bottles, containers, pipettes, tubes, medical devices, filter devices, membranes, slides, and medical implants. These items are typically formed by commonly practiced techniques such as injection molding, extrusion with end capping, blow molding, injection blow molding, etc.

Although the invention is targeted for cell adhesion, attachment, and growth, the resultant polymer substrate surface promotes adsorption of a number of biologically active molecules including but not limited to: peptides, proteins, carbohydrates, nucleic acid, lipids, polysaccarides, or combinations thereof, hormones, extracellular matrix molecules, cell adhesion molecules, natural polymers, enzymes, antibodies, antigens, polynuceotides, growth factors, synthetic polymers, polylysine, drugs and other molecules.

Any cell type known to one of skill in the art may be attached and grown on the treated substrates of the present invention. Examples of cell types which can be used include nerve cells, epithelial cells, mesenchymal stem cells, fibroblast cells, and other cell types.

While the mechanism for enhanced cell attachment to the substrate treated according to the present method is not fully understood, it is believed to stem from three general characteristics: surface morphology, chemical functionalities, and surface energy.

EXAMPLES

Example 1

Surface Morphology

Figure 4:
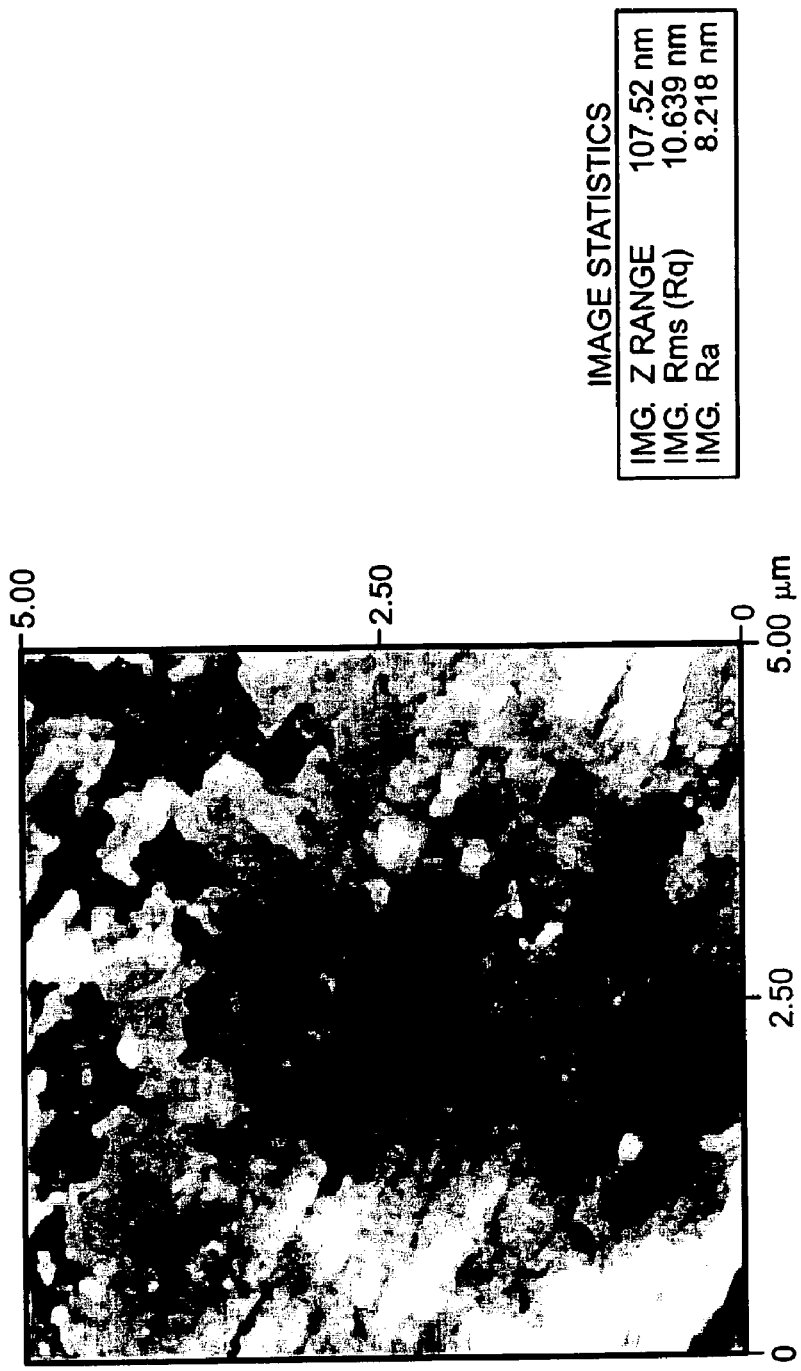
FIG. 4 is an AFM micrograph of a surface treated in accordance with the present invention, after being exposed to water.
Figure 5:
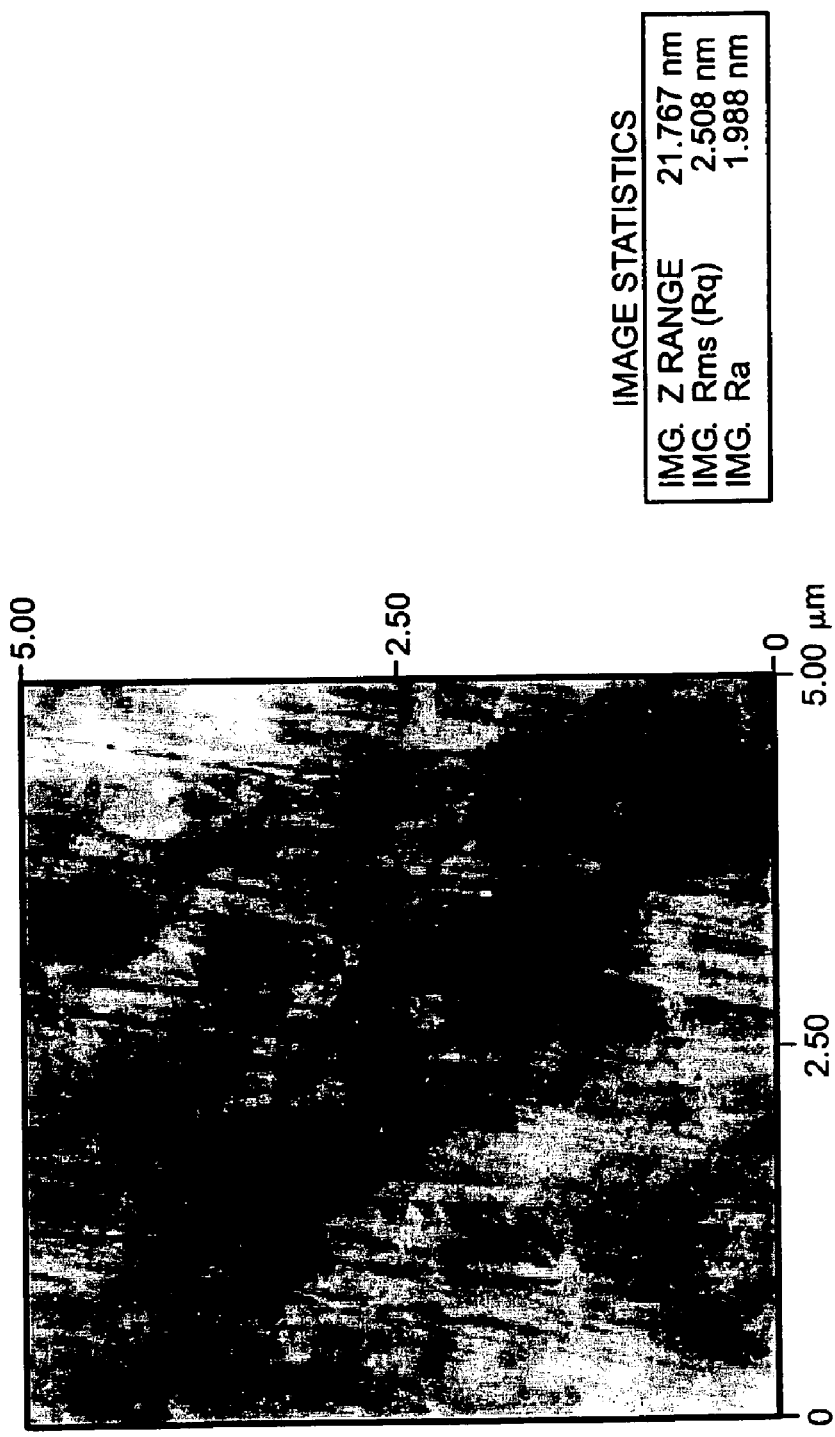
FIG. 5 is an AFM micrograph of a surface treated in accordance with the present invention, exposed only to air.

FIGS. 4 and 5 are AFM micrographs demonstrating surface morphology of a plasma treated surface created according to the present method. The above described apparatus and method were employed in order to produce the sample as shown in FIGS. 4 and 5. Nitrous oxide was used as the process gas, at a pressure of 270 millitorr, at a rate of 500 cc/min. The output from the microwave generator was 1500 watts, and the part was exposed to the plasma stream for 20 seconds.

Figure 6:
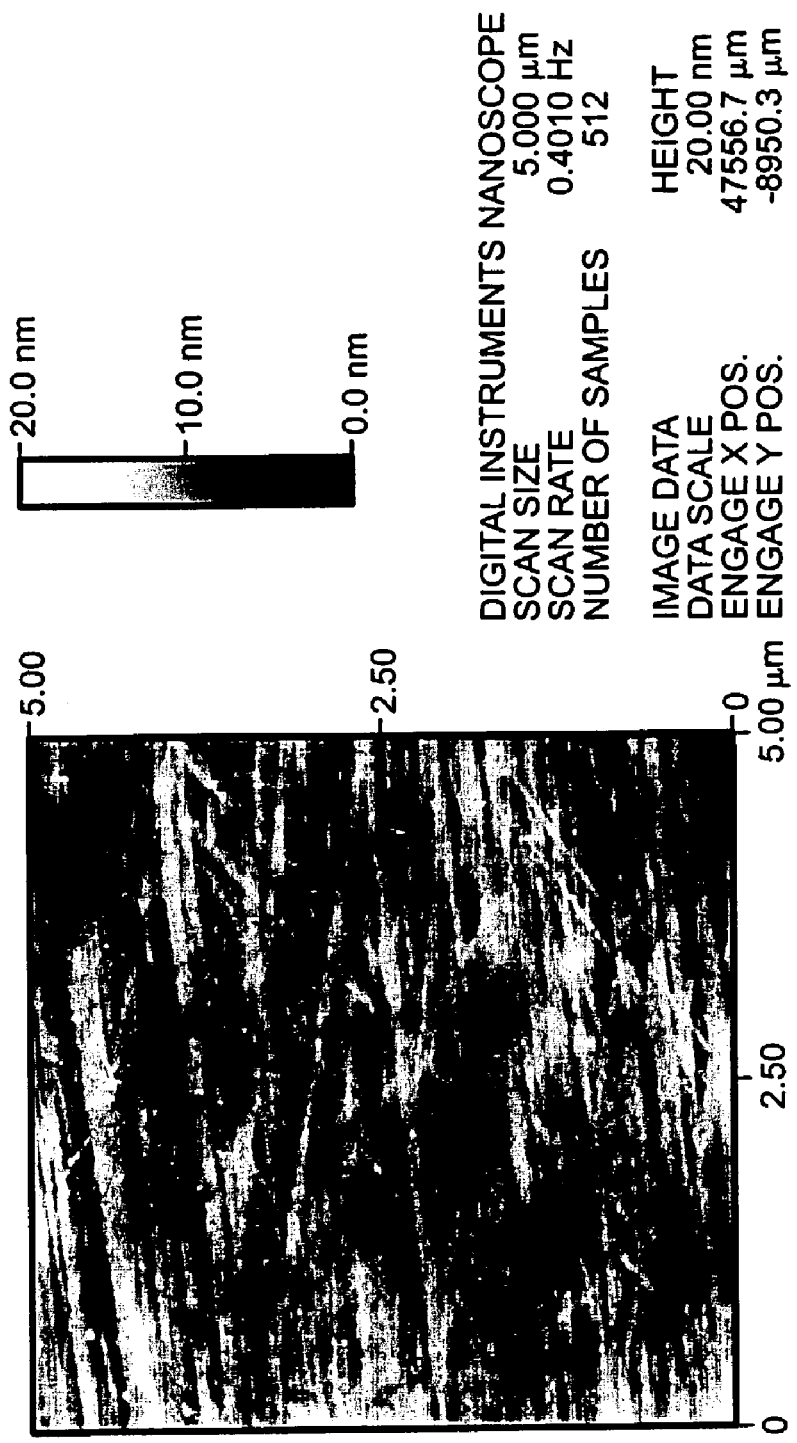
FIG. 6 is an AFM micrograph of a surface treated in accordance with a prior art radio frequency plasma method.

FIG. 4 shows the surface in water, while FIG. 5 shows the treated surface in air. For comparative purposes, FIG. 6 shows a surface that has been treated by a conventional RF plasma technique (using oxygen as a process gas, at a pressure of 270 millitorr, rate of 500 cc/min, and output from RF of 600 watts, treated for 3 minutes) as it appears in water. It can be noted that the surface of the microwave plasma treated substrate changes significantly when exposed to water. A roughened and high surface area morphology develops. The surface roughness as measured in RMS (Root Mean Square) increased at least 3 times, and approximately four times to five times with the microwave plasma surface in liquid as compared to that in air (comparing FIG. 4 and FIG. 5). The RF-treated surface did not undergo any significant change when exposed to water. It is believed that this roughened surface exposes a greater surface anchoring area to cells for attachment.

Example 2

Contact Angle

Figure 7:
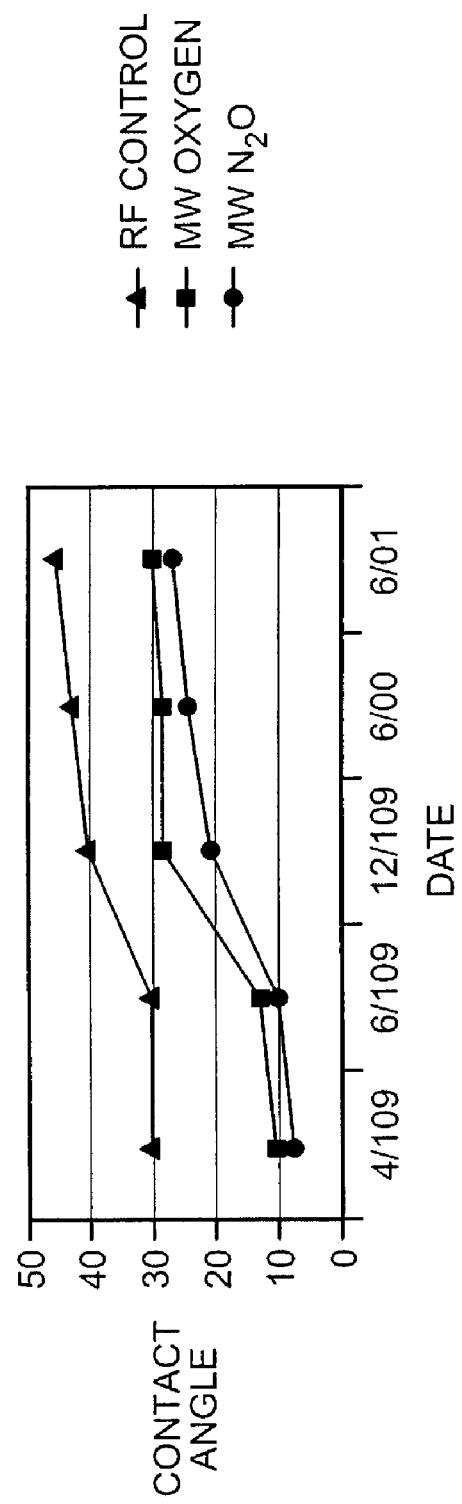
FIG. 7 is a graphical representation comparing the contact angle of substrate surfaces treated in accordance with the present invention and surfaces treated with a prior art radio frequency plasma method.

FIG. 7 is a graphical demonstration of contact angle measurements performed over a two-year period on the surface of three blow-molded, treated polystyrene roller bottles. Roller bottles were treated with standard RF plasma treatment, with microwave oxygen plasma under the same conditions as described above, and with microwave nitrous oxide plasma, also under the same conditions as described above. All of the roller bottles used in the experiment were from the same manufacturing run, surface treated at the same time, and subsequently gamma sterilized at the same time and under the same dosage. As can be ascertained by the table of FIG. 7, all three treatment methods showed an increase in contact angle over time. However, the microwave plasma treated roller bottles show significantly lower contact angles at time zero. As a consequence, even after over two years, the contact angle measured in the bottles affected by the microwave plasma treatment of the present invention, have contact angles that are lower or equivalent to the contact angle for the RF plasma treated substrates at time zero.

Example 3

Oxygen Content (MW Plasma v. RF Plasma)

Table 1 compares the surface chemistry of blow molded polystyrene roller bottles treated with RF plasma, microwave oxygen plasma, microwave nitrous oxide plasma, and an untreated control. Both the microwave plasma treatments were run with gas pressure of 270 millitorr, flow rate of 500 cc/min, output from microwave of 1500 watts and exposure time of 20 seconds. The RF plasma treatment was performed under the identical conditions described in Example 1 above. After treatment, the surfaces of the bottles were analyzed using ESCA (Electron Microscopy for Chemical Analysis). This test analyzes polystyrene for percentages of oxygen, carbon, and nitrogen species on the surface. As can be readily observed from the results, untreated polystyrene has approximately one hundred percent carbon species on its surface. RF plasma treatment significantly increases the oxygen surface content (17.8%), and creates a slight amount of nitrogen (0.2%). The microwave treatment of the present method imparted a surface oxygen content significantly exceeding that of RF plasma, (31% higher for MW-oxygen, 37% higher for MW-N$_2$O) while also marginally increasing the nitrogen surface content.

TABLE 1

| Sample | Carbon (%) | Oxygen (%) | Nitrogen (%) |
|---|---|---|---|
| Untreated | 100 | 0 | 0 |
| RF Plasma | 82.0 | 17.8 | 0.2 |
| MW Plasma Oxygen | 76.4 | 23.3 | 0.3 |
| MW Plasma N$_2$O | 75.2 | 24.3 | 0.5 |

Example 4

Oxygen Content (MW Plasma v. Corona Discharge)

Table 2 compares the surface chemistry of injection molded polystyrene flasks treated with standard corona discharge techniques, microwave oxygen plasma, microwave nitrous oxide plasma, and an untreated control. Parameters for the microwave plasma treatment were identical to those disclosed in Example 3 above. After treatment, the surfaces of the bottles were analyzed using ESCA. As shown in table 2, considerably more oxygen and nitrogen content were observed respectively on the microwave plasma treated surface when compared to the corona treated surface (32% higher for MW-oxygen, 42% higher for MW-N$_2$O).

TABLE 2

| Sample | Carbon % | Oxygen (%) | Nitrogen (%) |
|---|---|---|---|
| Untreated | 100 | 0 | 0 |
| Corona | 78.5 | 21.0 | 0.3 |
| MW Plasma Oxygen | 72.0 | 27.8 | 0.3 |
| MW Plasma N$_2$O | 69.3 | 29.8 | 1.0 |

Example 5

Cell Growth

Figure 8:
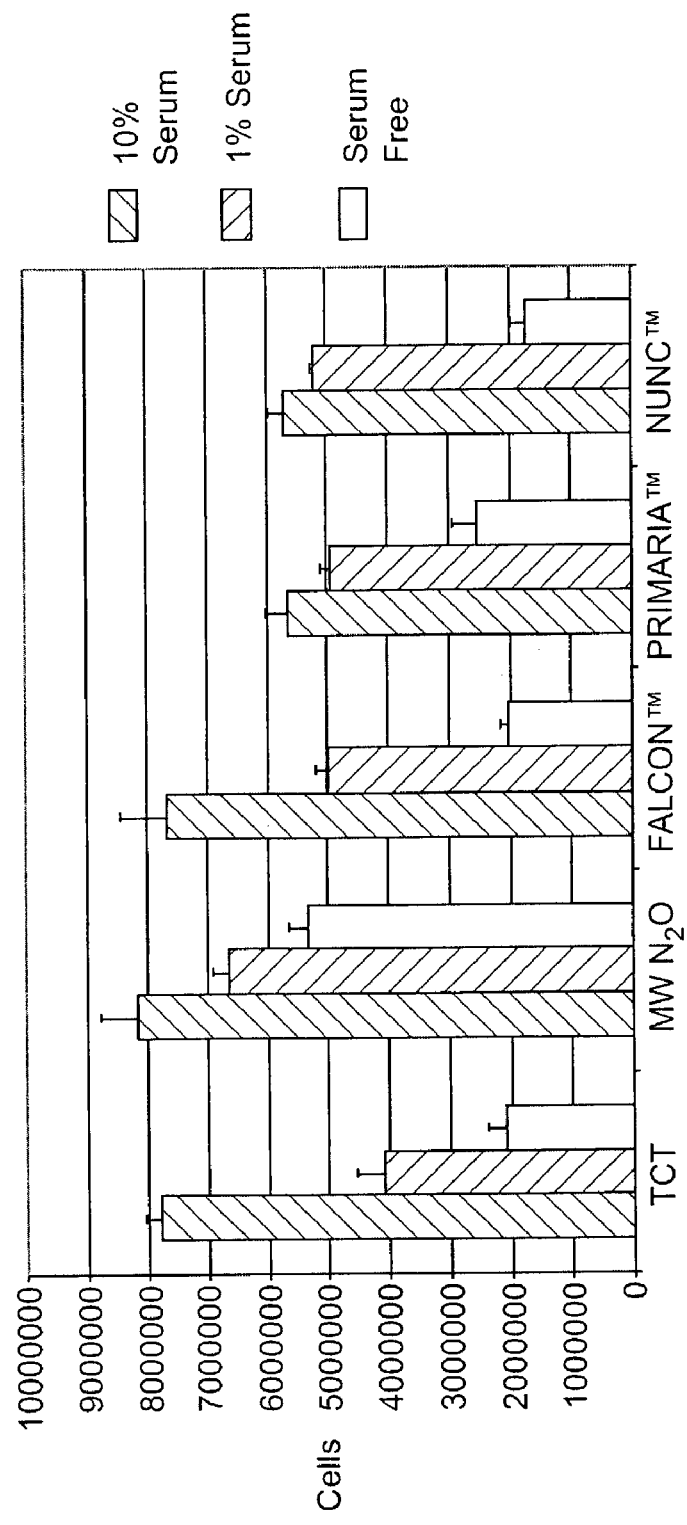
FIG. 8 is a graphical representation of a comparative cell growth study performed with injection molded polystyrene flasks from sampling of manufacturers and that have been treated with a variety of different methods, and comparing the microwave plasma method of the present invention.

FIG. 8 is a graphical representation of a comparative cell growth study performed with injection molded polystyrene flasks from sampling of manufacturers and that have been treated with a variety of different methods and comparing the microwave plasma method of the present invention. Cell growth conditions were measured under 10% serum, 1% serum and no serum growth conditions. The cell line used was Hek-293. Cells were seeded onto all surfaces at the same time, with the same initial number of cells, under the same conditions. Once the first flask was completely filled with a confluent monolayer of cells as determined by visual inspection, all samples were analyzed for cell count. Measurements were achieved by using a Coulter Counter™ (Beckman Coulter, Inc., Fullerton, Calif.). The sample substrates tested were, from left to right in the graph of FIG. 8, Corning corona tissue culture treated flask, (Corning Inc. Cat. #430641 ) microwave nitrous oxide plasma treatment as per the disclosed method, FALCON™ tissue culture flasks (Falcon, Cat. # 353111), PRIMERIA™ tissue culture flasks (Primaria, Cat. #353801), and NUNC™ tissue culture flasks (Nunc, Cat. #178891). As demonstrated in the graph of FIG. 8, the microwave plasma treatment substrate of the present invention outperformed all commercially available cell culture substrates tested, at all three serum levels.

EXAMPLE 6

Depth of Oxygen Content (MW Plasma vs. Corona)

Figure 9:
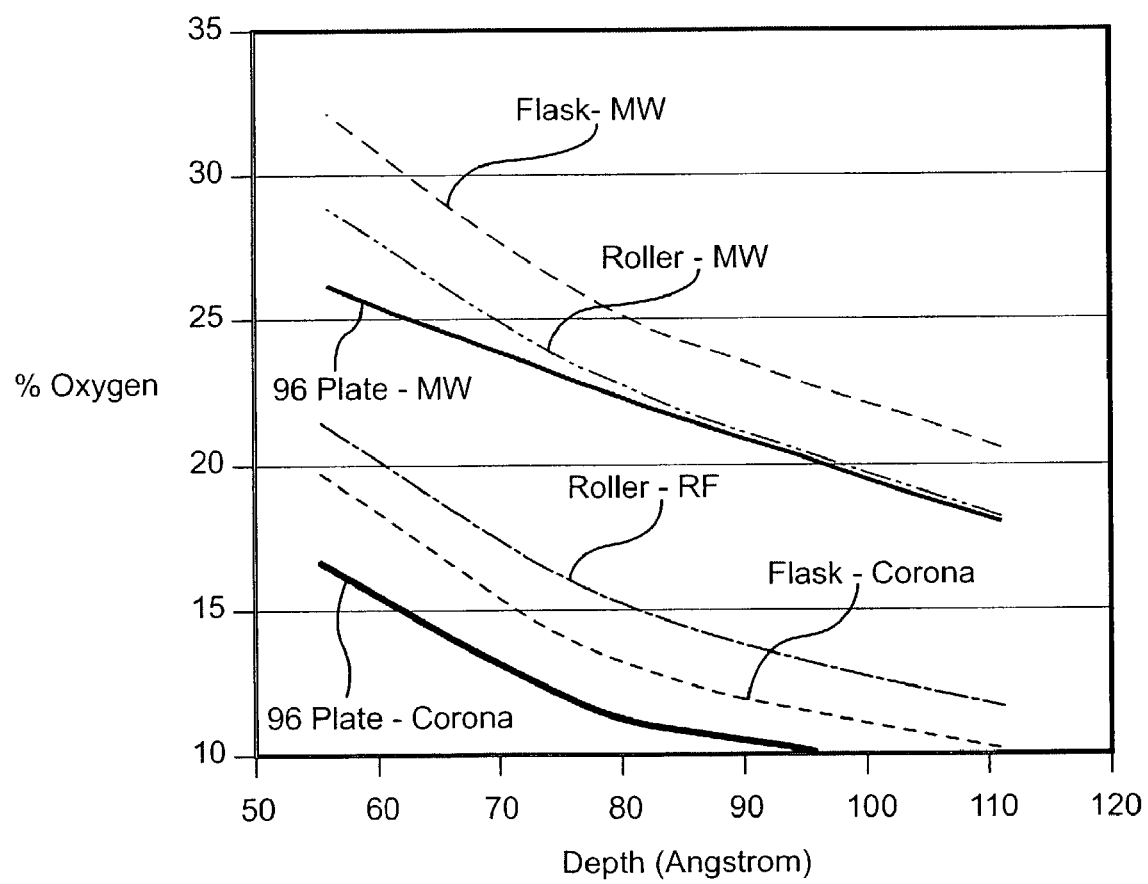
FIG. 9 is a graphical representation of oxygen content versus depth for parts from several manufacturers that have been treated with a variety of different methods, and comparing parts provided by the microwave plasma method of the present invention.

The samples treated in Example 4 were measured for oxygen content versus depth using ESCA. FIG. 9 shows the oxygen content in percent versus depth for a flask, a roller bottle, and a microplate (multiwell plate) using microwave plasma and a flask treated using corona discharge and a roller bottle treated using RF plasma. As shown in FIG. 9, the oxygen content of the flask, the bottle and microplate treated with microwave plasma exhibited an oxygen content greater than 25% at a depths greater than 50 Angstroms (30 degree take off angle). The parts treated with Corona or RF plasma had oxygen contens of less than about 22% and 20% at depths greater than 50 Angstroms. At depths of about 80 Angstroms in depth (45 degree take off angle), the microwave treated parts exhibited oxygen contents exceeding 22%, while the oxygen content of the RF and Corona plasma treated parts had oxygen contents of less than about 20% at depths of about 80 Angstroms. At depths of greater than about 110 Angstroms (take off angle of about 75 degrees), the microwave plasma treated parts exhibited oxygen contents exceeding about 17%, and the flask treated with microwave plasma had an oxygen content at depths greater than about 110 Angstroms exceeding about 20%. The RF and Corona plasma treated parts exhibited oxygen contents at depths greater than about 110 Angstroms of less than about 15%. Thus, the microwave plasma treated parts exhibited higher oxygen contents deeper into the surface of the parts.

From the foregoing description of the various preferred embodiments, it should be appreciated that the present invention may take many various forms and that the present invention is to be limited only by the following claims.

We claim:

1. A polymer substrate having a working surface upon which cells can be cultured wherein the surface oxygen content is at least 25 percent as measured by electron microscopy for chemical analysis at depth of about 50 Angstroms, and the substrate has a contact angle of less than 30 degrees after exposure to air for at least two months.

2. The substrate of claim 1 wherein said polymer is polystyrene.

3. The substrate of claim 1, wherein the substrate includes at least a portion of a roller bottle, a flask, or a multiwell plate.

4. The substrate of claim 1 wherein the surface oxygen content is at least 20 percent at a depth of about 80 Angstroms from the surface as measured by electron microscopy for chemical analysis.

5. The substrate of claim 1 wherein the oxygen content is at least 15 percent at a depth of about 110 Angstroms from the surface.

6. The substrate of claim 1 wherein the substrate has a contact angle of less than 30 degrees after exposure to air for at least six months.

7. The substrate of claim 1 wherein the substrate has a contact angle of less than 30 degrees after exposure to air for at least 12 months.

8. The substrate of claim 1 wherein the substrate has a contact angle of less than 30 degrees after exposure to air for at least 24 months.

9. The substrate of claim 1 wherein the polymer comprises a polyacrylate, a polymethylacrylate, a polycarbonate, a polysulphone, a polyhydroxy acid, a polyanhydride, a polyorthoester, a polypropylene, a polyphosphazene, a polyphosphate, a polyester, a nylon or a mixture thereof.

10. The substrate of claim 1 wherein the surface roughness as measured in Root Mean Square (RMS) of the substrate is increased, relative to the surface roughness of the untreated substrate, by a factor of at least three.

11. The substrate of claim 1 wherein the surface roughness as measured in Root Mean Square (RMS) of the treated substrate in water is increased by a factor of at least four relative to the surface roughness of the untreated substrate in air.

12. The substrate of claim 2 wherein the substrate includes at least a portion of a roller bottle, a flask, or a multiwell plate.

13. The substrate of claim 2 wherein the surface oxygen content is at least 20 percent at a depth of about 80 Angstroms from the surface as measured by electron microscopy for chemical analysis.

14. The substrate of claim 2 wherein the oxygen content is at least 15% percent at a depth of about 110 Angstroms from the surface.

15. The substrate of claim 2 wherein the surface roughness as measured in Root Mean Square (RMS) of the substrate is roughened and possesses a high surface area increased, relative to the surface roughness of the untreated substrate, by a factor of at least three.

16. A biological support comprising one or more biologically active molecules adsorbed to the surface of the substrate of claim 1.

17. The support of claim 16 wherein the biologically active molecule comprises a peptide, a protein, a carbohydrate, a nucleic acid, a lipid, a polysaccharide, a hormone, an extracellular matrix molecule, a cell adhesion molecule, a natural polymer, an enzyme, an antibody, an antigen, a polynucleotide, a growth factor, a synthetic polymer, polylysine, a drug, or combinations thereof.

18. A method for growing a plurality of cells comprising (a) depositing a parent set of cells on the substrate of claim 1, and (b) culturing the substrate with the deposited cells to promote the growth of the cells.

19. The method of claim 18 wherein the cells comprise nerve cells, epithelial cells, mesenchymal stem cells, or fibroblast cells.

20. A polymer substrate produced by the process comprising contacting a surface of the substrate with a stream of plasma comprising activated gaseous species generated by a microwave source, wherein the substrate has a contact angle of less than 30 degrees after exposure to air for at least two months.

21. The substrate of claim 20 wherein the gaseous species is derived from argon, nitrogen, oxygen, nitrous oxide, ammonia, carbon dioxide, helium, hydrogen, or air.

22. The substrate of claim 20 wherein the surface roughness as measured in Root Mean Square (RMS) of the substrate is increased, relative to the surface roughness of the untreated substrate, by a factor of at least three.

23. The substrate of claim 20 wherein the surface roughness as measured in Root Mean Square (RMS) of the treated substrate in water is increased by a factor of at least four relative to the surface roughness of the untreated substrate in air.

24. A biological support comprising one or more biologically active molecules adsorbed to the surface of the substrate of claim 20.

25. A method for growing a plurality of cells comprising (a) depositing a parent set of cells on the substrate of claim 20 and (b) culturing the substrate with the deposited cells to promote the growth of the cells.

26. A polymer substrate having a working surface upon which cells can be cultured comprising at least one cell culture surface and at least one side wall; wherein the surface oxygen content is at least 25 percent as measured by electron microscopy for chemical analysis at depth of about 50 Angstroms, and the substrate has a contact angle of less than 30 degrees after exposure to air for at least two months.

27. The substrate of claim 26 wherein said polymer is polystyrene.

28. The substrate of claim 26 wherein the substrate includes at least a portion of a flask, or a multiwell plate.

29. The substrate of claim 26 wherein the surface oxygen content is at least 20 percent at a depth of about 80 Angstroms from the surface as measured by electron microscopy for chemical analysis.

30. The substrate of claim 26 wherein the oxygen content is at least 15% percent at a depth of about 110 Angstroms from the surface.

31. The substrate of claim 26 wherein the polymer comprises a polyacrylate, a polymethylacrylate, a polycarbonate, a polyolefin, a polysuiphone, a polyhydroxy acid, a polyanhydride, a polyorthoester, a polypropylene, a polyphosphazene, a polyphosphate, a polyester, a nylon or a mixture thereof.

32. The substrate of claim 26 wherein the surface roughness as measured in Root Mean Square (RMS) of the substrate is roughened and possesses a high surface area increased, relative to the surface roughness of the untreated substrate, by a factor of at least three.

33. A polymer substrate having a working surface upon which cells can be cultured, wherein the substrate is produced by directing a stream of microwave plasma at the surface of the substrate in a controlled manner, and the substrate has a contact angle of less than 30 degrees after exposure to air for at least two months.

* * * * *

UNITED STATES PATENT AND TRADEMARK OFFICE
CERTIFICATE OF CORRECTION

PATENT NO. : 7,579,179 B2  Page 1 of 1
APPLICATION NO. : 10/382681
DATED : August 25, 2009
INVENTOR(S) : Marie D. Bryhan et al.

It is certified that error appears in the above-identified patent and that said Letters Patent is hereby corrected as shown below:

| Col. | Line | Description |
|---|---|---|
|  |  | item (74) on the cover page, please delete "Lawrence A. Villanue" and add "Lawrence A. Villanueva" |
| 10 | 35 | Please delete "polysuiphone" and add "polysulphone" |

Signed and Sealed this

Seventeenth Day of November, 2009

David J. Kappos
*Director of the United States Patent and Trademark Office*